Oct. 1, 1963

B. J. WARMAN 3,105,961

MAGNETIC STORAGE CORE ARRANGEMENTS

Filed March 4, 1959

INVENTOR

BLOOMFIELD JAMES WARMAN

BY Larson and Taylor 3,105,961
MAGNETIC STORAGE CORE ARRANGEMENTS
Bloomfield James Warman, Charlton, London, England, assignor to Associated Electrical Industries (Woolrich) Limited, London, England, a British company
Filed Mar. 4, 1959, Ser. No. 797,241
Claims priority, application Great Britain Mar. 6, 1958
4 Claims. (Cl. 340—174)

This invention relates to magnetic storage cores.

Magnetic cores form a convenient way of storing information in digital form since the two magnetic states of the cores can be arranged to represent the two binary digits 0 and 1 and the cores can be readily transferred from one state to the other by the application of suitable driving pulses.

With known storage arrangements the "reading" of the cores to derive the information stored therein inevitably results in the destruction of the storage information within the core and much expensive and complicated apparatus is required in order to re-write the information back into the storage cores after reading.

It is an object of the present invention to provide an arrangement whereby the storage information is not destroyed during the reading out process.

According to the present invention a magnetic storage arrangement comprises a pair of magnetic cores coupled so that a change in the magnetic state of either core produces a change in the magnetic state of the other core, each core having a coupling for applying resetting pulses thereto, setting means to condition the pair so that when resetting pulses are applied consecutively to each core in turn the magnetic states of both cores are changed over, and blocking means for preventing the resetting pulses from changing the magnetic state of either core in the unset condition.

The blocking means may comprise a third core provided in the coupling path between the two cores.

In carrying out the invention the resetting pulses to the cores may be fed through electrical circuit paths magnetically coupled with each core.

In one embodiment said circuit paths are also magnetically coupled to the third core so that a resetting pulse cancels any pulse in the coupling path between the two cores unless that resetting pulse has caused one of the cores to change its magnetic state.

In order that the invention may be more fully understood reference will now be made to the accompanying drawing, in which.

Figure 1:
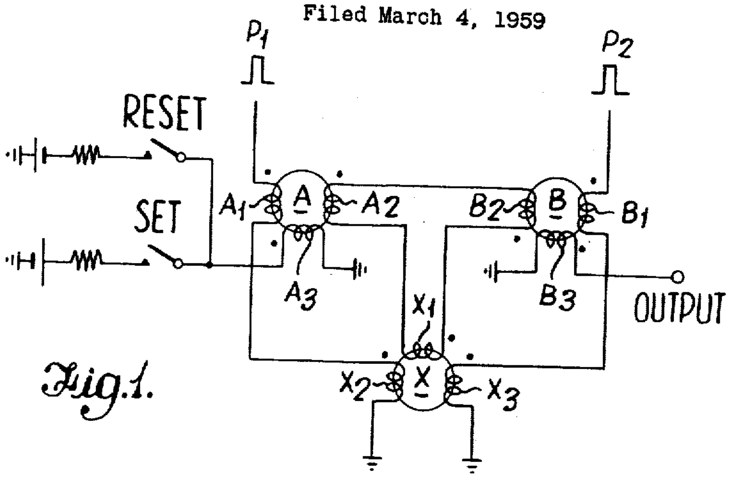
FIG. 1 shows an arrangement in accordance with the invention.

Referring now to FIG. 1 a pair of magnetic cores A and B are coupled through two windings A2 and B2 on the cores which are connected together. Core A has a winding A1 which is connected to a source of resetting pulses P1 and core B has a winding B1 connected to a source of resetting pulses P2. An additional winding B3 on core B provides a source of output pulses from the arrangement and an additional winding A3 on core A is connected to a setting control for the pair.

The two respective magnetic states of the cores are designated the set and un-set (or reset) condition and these may correspond to the two digits 0 and 1 of the binary system.

A polarity of pulses P1 and P2 and the direction of their associated windings A1 and B1 are such that they cause the re-setting of the respective cores A and B. If core A is set by means of a signal applied through setting winding A3 then a subsequent resetting pulse through winding A1 will cause that core to re-set. The action of reversal of the magnetic state of core A will cause a pulse to be generated in winding A2 which assuming direct connection between winding A2 and B2 will now cause core B to be set. A resetting pulse P2 applied to winding B1 will now re-set core B and this re-setting action will be regeneratively coupled through the winding A2 and thus set core A again in readiness for a subsequent resetting pulse. It will thus be seen that the resetting pulses cause successive pulses of opposite polarity to be generated in the output winding B3 of the pair which provides the read signal from the pair.

Figure 2:
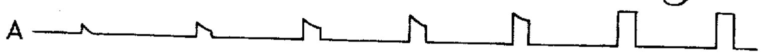
FIG. 2 and FIG. 3 show waveforms useful in explaining the operation of FIG. 1.
Figure 3:
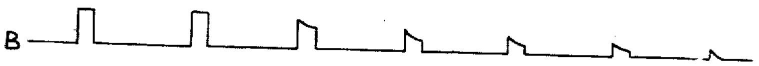

It has been found however that with a direct regenerative coupling between windings A2 and B2, the transfer action of the circuit is not sufficiently blocked in the absence of a setting signal. If core A is initially not set and resetting pulses of sufficient magnitude are applied thereto a successively increasing amount of energy will be regeneratively transferred between the cores until the cores fully turn over. The output from the device will thus gradually reach full value as shown in FIG. 2. If the resetting pulses are of smaller magnitude then even with a proper setting signal the coupling between the cores will be insufficient to turn the cores fully over and the output from the device will gradually decrease as shown in FIG. 3. In order to prevent such undesirable effects a third core X is introduced in the coupling between the two cores. Core X has a winding X1 in series with windings A2 and B2 and is also provided with a winding X2 in series with winding A1 and a winding X3 in series with winding B1.

In the conditions when the A and B cores are not set then the signal introduced from windings X2 and X3 in the unset X core will, by means of signals applied to winding X1, cancel the signals in the coupling loop between cores A and B. This prevents the build up of any transfer between the cores. If however the A core has previously been set by the setting winding then the change of magnetic state in the A core generates a pulse of magnitude which is easily able to overcome the oppositely induced signal in winding X2 and thus B core is readily set thereby. A similar effect occurs when B core is reset.

Figure 4:
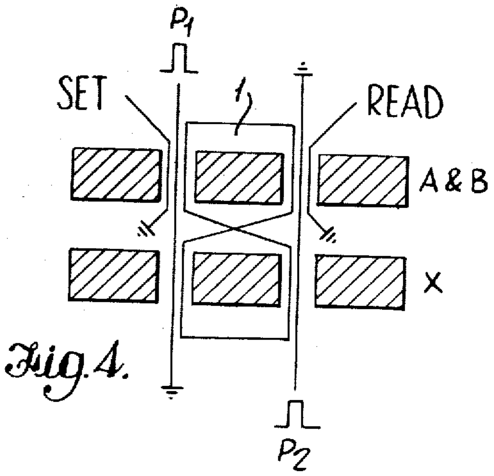
FIG. 4 shows an embodiment of the invention.

A practical arrangement is shown in FIG. 4 in which a large number of ferrite blocks are provided and the driving pulses can be magnetically coupled to those blocks by means of wires inserted through holes in these blocks. The regenerative coupling loop between cores A and B and through core X is shown as connection 1 in the figure.

A number of blocks or sets of cores might be arranged in a serial fashion as regards the output circuit. For example with the FIG. 4 arrangement, a single read out wire could be taken through a number of such core elements in the same block so that if these elements are read by differently spaced pulses, then the read out wire would deliver the stored information as a train of markings upon a single wire, so that the arrangement would function as a multi-position reiterative store in much the same way as, say, a delay line store would function. Only the output read pulses would need to be time spaced, since the re-write pulse could be common to all the elements and could occur at the end of each cycle of read pulses.

What I claim is:

1. A magnetic storage core arrangement comprising a pair of magnetic cores, means for applying resetting pulses to each core, a transfer coupling path between the cores which on the application of a resetting pulse to a set core transfers the setting to the opposite core, whereby on initially setting one of the cores the application of resetting pulses to each core alternately causes the setting to be transferred back and forth between the cores, a third core coupled to said coupling path, and means for applying said resetting pulses to said third core to induce pulses in the coupling circuit whereby to block the transfer of pulses along said coupling path between the storage cores in either direction below a threshold value reached when a storage core changes its magnetic state.

2. A magnetic storage core arrangement comprising a pair of magnetic cores, a coupling path between said pair of cores, a third core coupled to said coupling path, means for simultaneously applying resetting pulses to one core of said pair and said third core and means for simultaneously applying resetting pulses to the other core of said pair and said third core, whereby when a core of said pair is initially set the application of resetting pulses to each core of the pair alternately causes the setting to be transferred back and forth between the cores of the pair and when neither core of said pair is set transfer between the pair is blocked by the resetting pulses applied to said third core inducing an opposing E.M.F. in the coupling path.

3. A magnetic storage core arrangement comprising a pair of magnetic cores, a coupling path between said pair of cores, a third core coupled to said coupling path, means for simultaneously applying resetting pulses to one core of said pair and said third core and means for simultaneously applying resetting pulses to the other core of said pair and said third core, setting means for a core of said pair, whereby when said setting means is operated the application of resetting pulses to each core of the pair alternately causes the setting to be transferred back and forth between the cores of the pair and when said setting means is not operated transfer between the pair is blocked by the resetting pulses applied to said third core inducing an opposing E.M.F. in the coupling path, and output coupling means coupled to a core of said pair.

4. A magnetic storage core arrangement comprising a pair of magnetic storage cores, means for applying separate resetting pulses to each storage core alternately, a transfer coupling path between the storage cores, said path including windings respectively wound around the storage cores in the same sense so that the application of a resetting pulse to a storage core in the set state induces a current in the coupling path which transfers the setting to the opposite storage core, and a transfer core having a winding in said coupling path wound in an opposite sense to those on the storage cores and having further windings adapted to receive the resetting pulses to both said storage cores, said transfer core being operable by the resetting pulses to oppose, by transformer action, the production of the E.M.F. induced in the coupling path and thereby prevent the setting being transferred between the storage cores excepting when a storage core has its magnetic state reversed.

References Cited in the file of this patent

UNITED STATES PATENTS

| | | |
|---|---|---|
| 2,753,545 | Lund | July 3, 1956 |
| 2,769,925 | Saunders | Nov. 6, 1956 |
| 2,781,503 | Saunders | Feb. 12, 1957 |
| 2,819,395 | Jones | Jan. 7, 1958 |
| 2,886,801 | Briggs | May 12, 1959 |
| 2,904,779 | Russell | Sept. 15, 1959 |

UNITED STATES PATENT OFFICE
CERTIFICATE OF CORRECTION

Patent No. 3,105,961 October 1, 1963

Bloomfield James Warman

It is hereby certified that error appears in the above numbered patent requiring correction and that the said Letters Patent should read as corrected below.

In the grant, lines 2 and 3, and line 12, and in the heading to the printed specification, lines 4 and 5, for "Associated Electrical Industries (Woolrich) Limited" read -- Associated Electrical Industries (Woolwich) Limited --.

Signed and sealed this 31st day of March 1964.

(SEAL)
Attest:

ERNEST W. SWIDER

Attesting Officer

EDWARD J. BRENNER

Commissioner of Patents